Patented Sept. 21, 1954

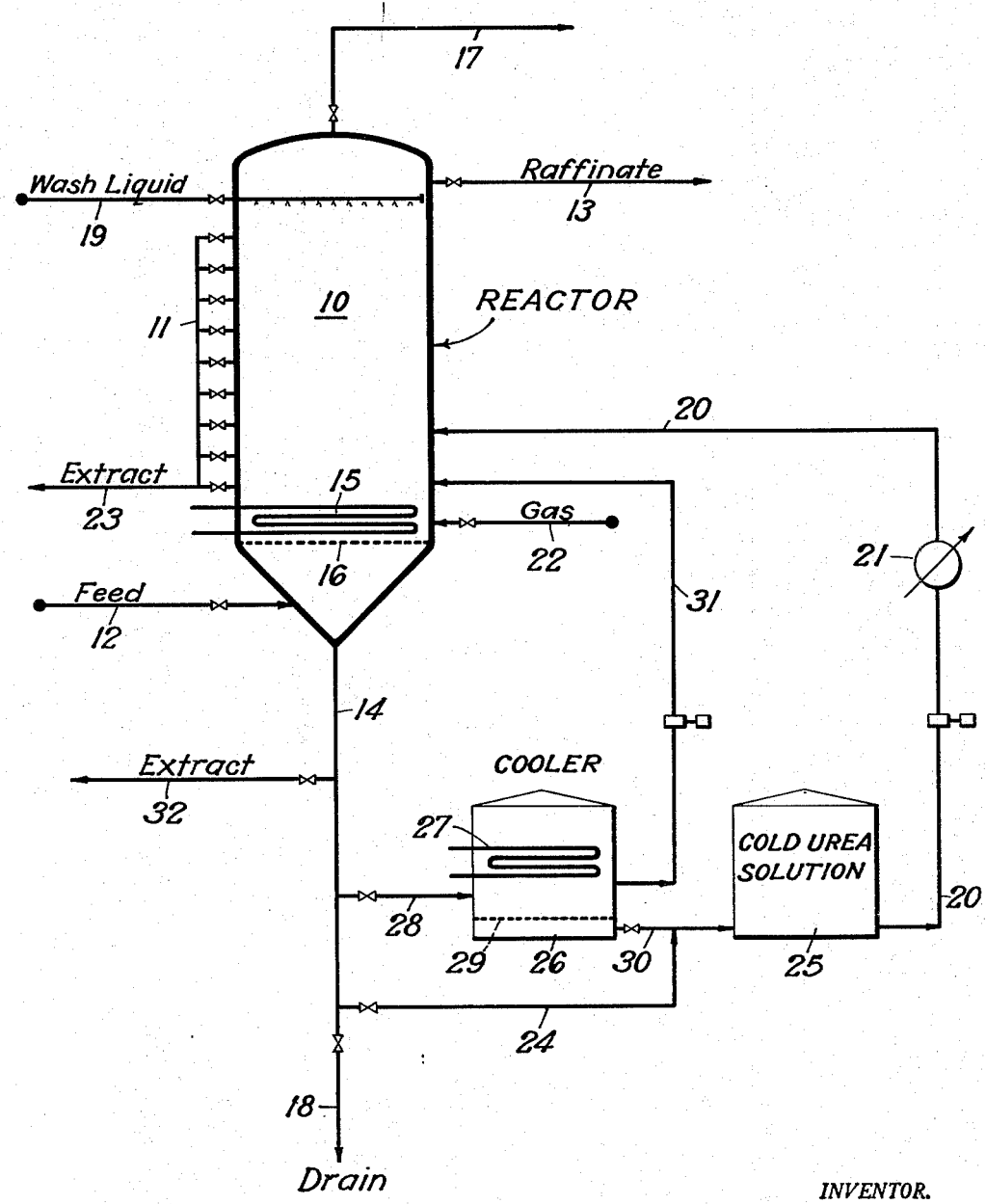

2,689,845

UNITED STATES PATENT OFFICE 2,689,845

SEPARATING ORGANIC COMPOUNDS

Robert A. Dinerstein, Park Forest, Ill., assignor to Standard Oil Company, Chicago, Ill., a corporation of Indiana Application June 30, 1949, Serial No. 102,353

3 Claims. (Cl. 260—96.5)

This invention relates to the separation of straight-chain organic compounds from branched-chain and cyclic compounds and applies particularly to hydrocarbons having six carbon atoms or more in the molecule. In addition to the separation of hydrocarbons, various other organic compounds can be separated such as the alcohols, sulfides, mercaptans, ketones, aldehydes, acids and esters. The invention relates particularly to a process of forming complexes with such straight-chain organic compounds and urea followed by separation and decomposition of the complexes and recovery and re-use of the urea.

The invention is illustrated by a drawing which shows diagrammatically an apparatus for carrying out the process.

It has heretofore been known that under certain conditions urea will form crystalline complexes with straight-chain organic compounds. Thus, it has been possible to separate such compounds as normal octane from isooctane or mixtures thereof by contacting with urea to form the urea-n-octane complex, separating the isooctane, washing off adhering isooctane, for example with pentane or isohexane, then decomposing the urea-n-octane complex in various ways, for example, by heating to liberate the hydrogen and recover the urea for further use. The reactions of urea with straight-chain organic compounds are shown in German patent application O. Z. 12,438 B. 190,197 of Friedrich Bengen (March 18, 1940) and reproduced in Technical Oil Mission Reel 6, Frames 263–270. The formation of the urea complexes is facilitated by the presence of a suitable solvent such as water, methanol and acetone, the amount of the solvent being of the order of about one-fourth mol to two mols per mol of urea employed. The temperature of formation of the complex is ordinarily less than 150° F. and usually temperatures of 80 to 120° F. are preferred.

Regeneration of the urea and recovery of the straight-chain organic compound is conveniently effected by heating the complex to an elevated temperature, approaching the melting point of urea, 132.7° C. (270° F.), by the addition of a urea solvent such as water, methanol, etc., or a combination of both. When a solvent is used it is not necessary to heat the complex above about 175 to 200° F. and if sufficient solvent is used it need not be heated at all to effect the decomposition. Generally about 2 to 20 mols of solvent per mol of urea are sufficient, depending on whether the solvent is water, methanol, ethyl alcohol, acetone, etc., or mixtures thereof. When a solvent is added for the purpose of decomposing the complex, however, it later becomes necessary to remove the added solvent by distillation before the urea can be used again in the process. On account of the necessity of using large quantities of urea in the process, the cost of distillation of solvent can be a very considerable factor in the economics of the process. An important object of this invention is to avoid the distillation of solvent in the urea regeneration step of the process.

According to my invention, the decomposition of the urea complex is effected by contacting with a solution of urea in a solvent, the solution being only partially saturated with urea at the temperature of the contacting operation. It is satisfactory to use a solution having a degree of urea saturation of about 25 to 60 per cent at the regeneration temperature. When the urea complex is completely decomposed by the treatment with urea solution at elevated temperature, the associated straight-chain organic compound, herein termed "extract," is separated from the urea solution phase and the urea solution is then cooled to cause the separation therefrom of the crystalline urea suitable for use in the treatment of further amounts of feed stock containing straight-chain material. The cold mother liquor is separated from the crystalline urea and separately heated to supply additional urea solution for further use in decomposition.

The process lends itself very well to either continuous, semi-continuous, or batchwise operation. Thus, I may operate my process in a continuous manner by contacting the urea and feed stock in a countercurrent tower with a downwardly moving bed of solid, finely divided urea therein, the complex being withdrawn at the bottom and discharged into a washing zone and then into a decomposing zone where it is mixed with the hot unsaturated urea solution.

Referring to the drawing, reactor 10 is a pressure vessel with sufficient strength to retain the vapors of solvent when heated therein. It is equipped with extract outlet manifold 11, feed inlet 12, raffinate outlet 13, discharge line 14, heat exchanger coil 15 for either heating or cooling, and perforated plate or grid 16. In a typical operation of my process, a charge of finely powdered urea wet with a small amount of a solvent, e. g. one-half mol of water, is charged to the reactor 10. Straight-run naphtha containing normal paraffin hydrocarbons is introduced thru feed line 12 and passed upwardly thru the bed of urea, thereby forming a complex between the normal hydrocarbons in the naphtha and the urea. The feed may be a heavy naphtha fraction boiling in the range of about 200 to 400° F. The heavy naphtha raffinate from which the normal paraffin hydrocarbons have been extracted is discharged by line 13 to be used for blending in antiknock gasoline, the removal of the normal paraffins substantially decreasing the knocking characteristics of the naphtha. The temperature of the contacting operation may suitably be about 90° F. The amount of the feed stock which can be treated depends on the charge of urea and the concentration of normal paraffins in the feed. It has been found that the number of mols of urea required for the formation of the complex is approximately equal to two less than the number of carbon atoms in the normal paraffin hydrocarbon with which it reacts.

When the urea in the reactor has been largely converted to the complex, the feed is discontinued and the naphtha remaining in the reactor is withdrawn thru outlet 14 and drain 18, suitably leading back to the feed supply tank. It is preferred to wash the complex in reactor 10 by spraying it with a non-straight-chain hydrocarbon or a hydrocarbon having less than six carbon atoms, e. g. pentane, benzene, cyclohexane, isooctane, etc., line 19 being provided for the purpose.

The complex is now in condition for decomposition and regeneration of the urea. According to my process, this is accomplished by injecting a hot solution of urea thru line 20 into reactor 10. The temperature of the solution may be about 200 to 250° F., heat being supplied by heater 21. Additional heat may be supplied by passing steam thru heating coil 15. The urea solution introduced thru line 20 may be about 40 to 50 per cent saturated with respect to urea at the temperature of injection. The complex in reactor 10 is thoroughly agitated with the hot urea solution, a mechanical agitator being provided, if desired, or a suitable agitation gas may be introduced thru line 22 and withdrawn thru vent 17 leading to a gas holder from which the gas can be recycled by means of a compressor, if desired. After the complex has been completely decomposed, it is allowed to settle quietly to separate normal paraffin hydrocarbons which form in a layer on the surface and which can be drawn off at one or more of the extract discharge lines leading into manifold 11 and outlet 23.

After the extract has been separated, the hot urea solution in reactor 10 is cooled again by circulating cooling water or a suitable refrigerant thru coil 15, thereby crystallizing the urea in the reactor in the form of fine crystals suitable for reaction with further quantities of naphtha. Cold urea solution or mother liquor is then withdrawn thru draw-off line 14 and line 24 leading to cold urea solution storage 25. The operation is then ready to be repeated. If desired, two or more reactors can be conveniently manifolded to a single cold urea solution storage 25 and a semi-continuous operation can be obtained in this way.

In a modification of my process, I may omit cooling the hot urea solution in reactor 10 but conduct it by line 28 directly to solution cooler 26 provided with cooling coil 27. The upper layer of straight chain compounds can be drawn off thru extract outlet 32. After cooling in cooler 26 where urea is crystallized, the cold saturated urea solution or mother liquor is withdrawn thru filter element or supporting grid 29 in the base of cooler 26 and conducted by line 30 to cold urea solution storage 25. The solid, finely crystallized urea in 26 is then returned to the reactor 10, any one of various methods being used for this purpose. Thus it may be melted in 26 by supplying heat thru coil 27 and returned to the reactor by means of a pump in line 31, the melted urea being finely subdivided in 10 by contacting with cold feed stock under agitation, or the urea in 26 may be transferred by a suitable device to reactor 10, for example by means of a mechanical conveyor or by simply dropping it thru a chute where cooler 26 is at a higher level than the reactor 10. It may also be conducted from cooler 26 in a slurry with feed stock prepared by means not shown.

As an example of my process, a mixture of hydrocarbons containing 27 grams of cetane and 150 milliliters of isooctane was contacted with 110 grams of urea wetted with 20 ml. of methanol, e. g. about one-half mol. The time of contact was one hour at a temperature of about 80° F. A crystalline complex resulted from which unreacted hydrocarbon was filtered after which the complex was washed with a light hydrocarbon solvent. Analysis showed only one gram of cetane left in the filtrate washings, indicating about 96% of the cetane had reacted with the urea.

The complex was now decomposed by addition of hot urea solution containing 600 grams of urea and 400 grams of water. The temperature of decomposition was about 194° F. (90° C.). An upper oil phase was separated from the urea solution and yielded 24 grams of cetane, corresponding to a yield of 89% of the cetane in the feed stock.

The urea solution was then cooled with stirring and the fine urea crystals which formed were filtered to give a mass of urea having a weight of 467 grams. Obviously less urea could be used in the decomposing solution to provide a yield of urea of only about 110 grams needed for the next run. No addition of fresh solvent in the decomposition step was required and likewise no evaporation of solvent was necessary.

Having thus described my invention what I claim is:

1. An improved process for separating an organic compound of the class of straight-chain organic compounds having at least six carbon atoms in the molecule from a charging stock comprised thereof with an organic compound of another class with respect to molecular configuration or size, which comprises contacting said charging stock with solid, finely divided urea in the presence of around one-half mole of water per mole of urea under conditions of temperature and pressure and for a length of time adapted to effect formation of a solid complex of urea and said straight-chain organic compound; removing unreacted charging stock from the resulting urea complex; decomposing said complex by contacting it at a temperature above about 175° F. with an aqueous solution of urea, said solution being initially unsaturated with urea at said temperature and substantially saturated with urea at ordinary temperatures, thereby increasing the urea concentration of said solution and liberating said straight-chain organic compound as a separate phase; separating and withdrawing said liberated straight-chain organic compound phase; cooling said urea solution and crystallizing urea therefrom; separating crystalline urea from the cooled solution; withdrawing cool, saturated urea solution, heating said solution to a temperature above about 175° F., and recycling said solution for the decomposition of additional urea complex; and recycling said crystalline urea to the contacting of further quantities of said charging stock.

2. An improved process for separating a hydrocarbon of the class of straight-chain hydrocarbons having at least six carbon atoms in the molecule from a charging stock comprised thereof with a hydrocarbon of another class with respect to molecular configuration or size, which comprises contacting said charging stock with solid, finely divided urea in the presence of around one-half mole of water per mole of urea under conditions of temperature and pressure and for a length of time adapted to effect formation of a solid complex of urea and said straight-chain hydrocarbon; removing unreacted charging stock from the resulting urea complex; decomposing said complex by contacting it at a temperature between about 175 and 250° F. with an aqueous solution of urea initially having a degree of saturation between about 25 and 60 percent at said temperature, said solution being substantially saturated with urea at ordinary temperatures, thereby increasing the urea concentration of said solution and liberating said straight-chain hydrocarbon as a separate phase; separating and withdrawing said liberated straight-chain hydrocarbon phase; cooling said urea solution and crystallizing urea therefrom; separating crystalline urea from the cooled solution; withdrawing cool saturated urea solution, heating said solution to a temperature between about 175 and 250° F., and recycling said solution for the decomposition of additional urea complex; and recycling said crystalline urea to the contacting of further quantities of said charging stock.

3. A process for separating straight chain and non straight chain hydrocarbons from mixtures which comprises contacting such a mixture with solid, finely divided urea in the presence of around one-half mole of water per mole of urea to form crystalline molecular complexes of hydrocarbons and urea; separately recovering said crystalline complexes; admixing an aqueous solution, saturated with urea at ordinary temperatures, with said crystalline complexes at a temperature at which the said aqueous solution is initially less than saturated with urea and at which the complexes are decomposed to liberate the urea and hydrocarbons and the aqueous solution is reinforced with said liberated urea; separating the reinforced aqueous solution of urea from the hydrocarbons; cooling the reinforced aqueous solution of urea and crystallizing urea therein; separately recovering solid, finely divided urea and a cooled, saturated urea solution; recycling solid, finely divided urea thus recovered for treatment of further quantities of the original hydrocarbon mixture; and heating and recycling said recovered urea solution for treatment of further quantities of said crystalline molecular complexes of hydrocarbons and urea.

References Cited in the file of this patent

UNITED STATES PATENTS

| Number | Name | Date |
| --- | --- | --- |
| 2,499,820 | Fetterly | Mar. 7, 1950 |
| 2,520,715 | Fetterly | Aug. 29, 1950 |
| 2,520,716 | Fetterly | Aug. 29, 1950 |
| 2,557,257 | Melrose | June 19, 1951 |
| 2,569,986 | Fetterly | Oct. 2, 1951 |

OTHER REFERENCES

German patent application of Friedrich Bengen, O. Z. 12438, B.190, 197, March 18, 1940, 5 pages.

Australian patent application 17339/47 filed December 31, 1947, 23 pages.